US009785263B2

(12) United States Patent
Curtis

(10) Patent No.: US 9,785,263 B2
(45) Date of Patent: Oct. 10, 2017

(54) TOUCH SCREEN STYLUS WITH FORCE AND/OR ANGLE SENSING FUNCTIONALITY

(71) Applicant: Microchip Technology Incorporated, Chandler, AZ (US)

(72) Inventor: Keith Curtis, Gilbert, AZ (US)

(73) Assignee: MICROCHIP TECHNOLOGY INCORPORATED, Chandler, AZ (US)

(*) Notice: Subject to any disclaimer, the term of this patent is extended or adjusted under 35 U.S.C. 154(b) by 0 days.

(21) Appl. No.: 14/462,242

(22) Filed: Aug. 18, 2014

(65) Prior Publication Data

US 2016/0048225 A1     Feb. 18, 2016

Related U.S. Application Data

(60) Provisional application No. 61/868,899, filed on Aug. 22, 2013.

(51) Int. Cl.
*G06F 3/0354* (2013.01)
*G06F 3/044* (2006.01)
(Continued)

(52) U.S. Cl.
CPC ........ *G06F 3/03546* (2013.01); *G06F 3/0338* (2013.01); *G06F 3/03545* (2013.01);
(Continued)

(58) Field of Classification Search
None
See application file for complete search history.

(56) References Cited

U.S. PATENT DOCUMENTS 7,049,828 B1 * 5/2006 Urquidi ............... G01D 5/2405
324/515
2002/0180462 A1* 12/2002 Hartwell ............... G01P 15/18
324/662
(Continued)

FOREIGN PATENT DOCUMENTS

| EP | 1983408 A2 | 10/2008 | ............ G06F 3/033 |
| JP | 2002297300 A | 10/2002 | ............ G06F 3/03 |
| WO | 2012/123951 A2 | 9/2012 | ............ G06F 3/044 |

OTHER PUBLICATIONS

Curtis, Keith, "AN1325: mTouch™ Metal Over Cap Technology," Microchip Technology Incorporated, DS01325A, 8 pages, Jan. 5, 2010.
(Continued)

*Primary Examiner* — Patrick Edouard
*Assistant Examiner* — Matthew Yeung
(74) *Attorney, Agent, or Firm* — Slayden Grubert Beard PLLC

(57) ABSTRACT

A handheld stylus for use with a display device may include a handheld body, a tip movably coupled to the body, and at least one capacitive sensor configured to detect movements of the tip relative to the body. The at least one capacitive sensor may comprise at least one first conductive element secured to or integral with the body, and at least one second conductive element secured to or integral with the movable tip. The tip may be arranged such that the at least one first conductive element and the at least one second conductive element are spaced apart from each other. The at least one capacitive sensor may be configured to detect changes in respective distances between the at least one first conductive element and the at least one second conductive element caused by movements of the tip relative to the body.

22 Claims, 6 Drawing Sheets

(51) Int. Cl.
  *G06F 3/0338*  (2013.01)
  *G06F 3/041*  (2006.01)
(52) U.S. Cl.
  CPC ............ *G06F 3/044* (2013.01); *G06F 3/0412* (2013.01); *G06F 3/0414* (2013.01)

(56) References Cited

U.S. PATENT DOCUMENTS

| | | | |
|---|---|---|---|
| 2010/0085471 A1* | 4/2010 | Craven-Bartle | G06F 3/0317 348/371 |
| 2011/0155479 A1* | 6/2011 | Oda | G06F 3/03545 178/18.06 |
| 2012/0074962 A1 | 3/2012 | Fukushima et al. | 324/661 |
| 2012/0154340 A1 | 6/2012 | Vuppu et al. | 345/179 |
| 2012/0327042 A1 | 12/2012 | Harley et al. | 345/179 |
| 2014/0009863 A1* | 1/2014 | Obata | G01D 5/2417 361/294 |
| 2014/0165742 A1* | 6/2014 | Fergusson | G06F 3/03545 73/862.68 |
| 2014/0240298 A1* | 8/2014 | Stern | G06F 3/0383 345/179 |
| 2015/0160744 A1* | 6/2015 | Mohindra | G06F 3/03545 345/179 |

OTHER PUBLICATIONS

International Search Report and Written Opinion, Application No. PCT/US2014/052008, 11 pages, dated Dec. 4, 2014.

\* cited by examiner

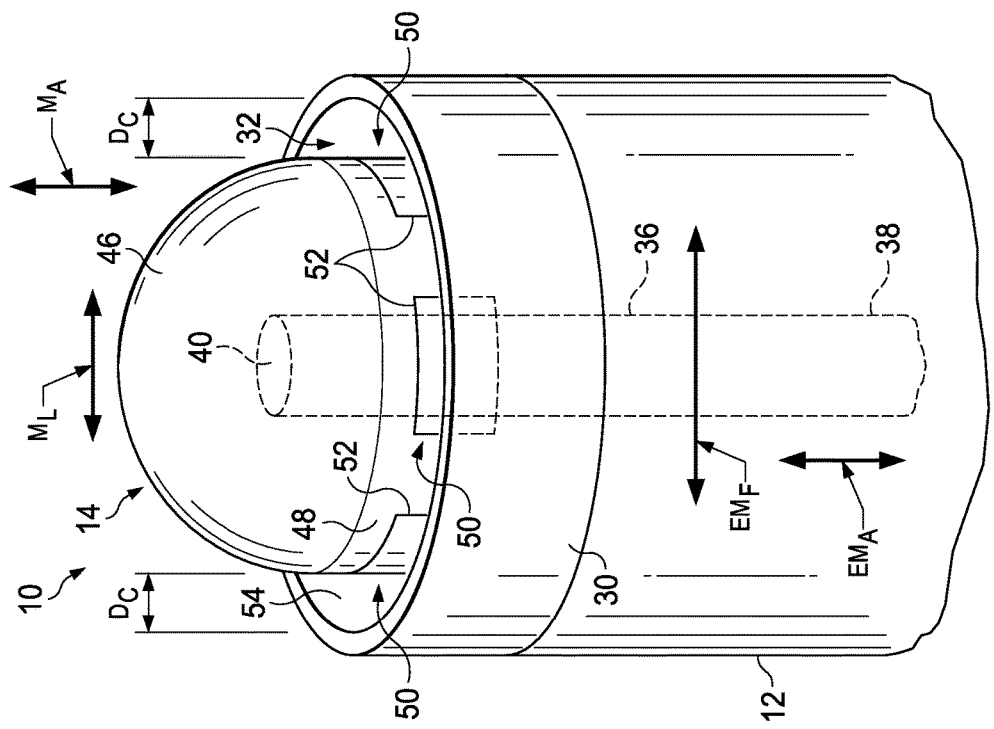
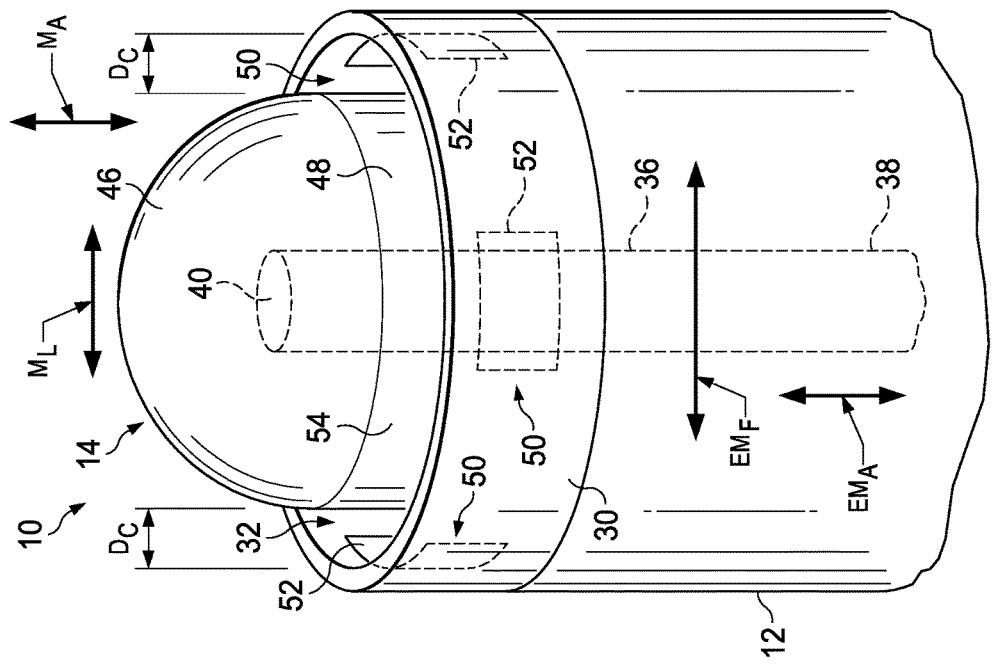

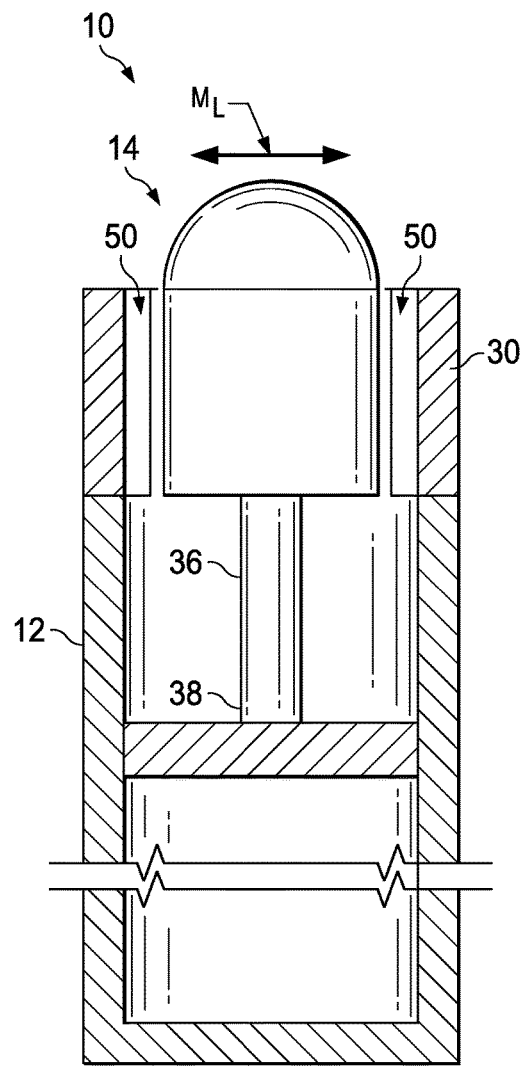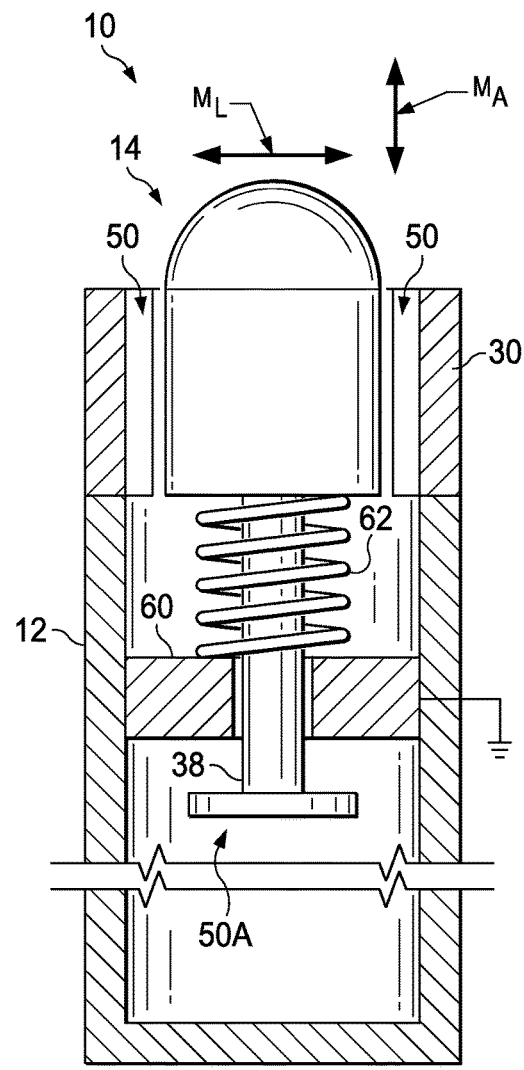

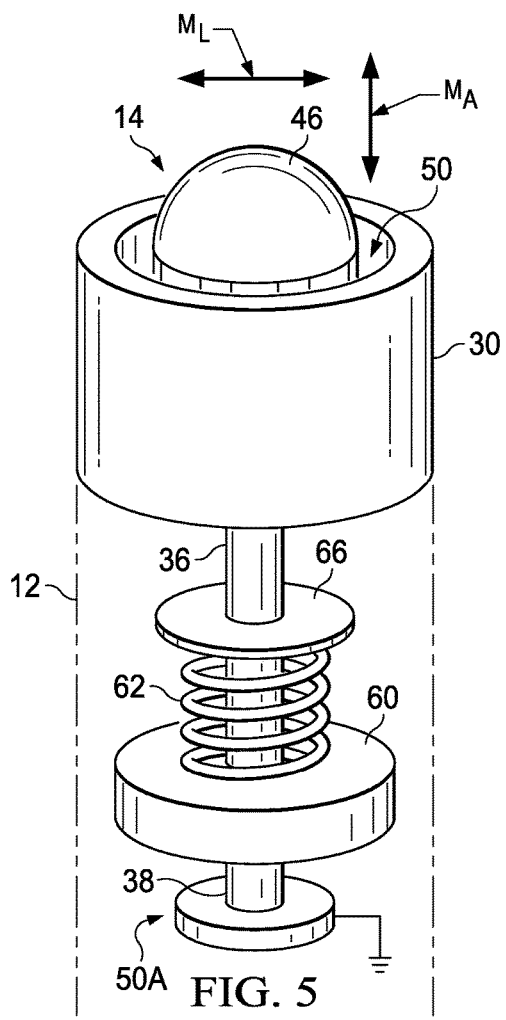
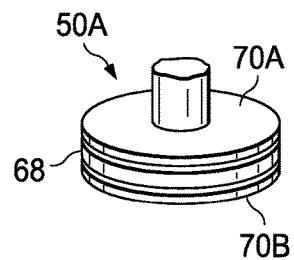
FIG. 6
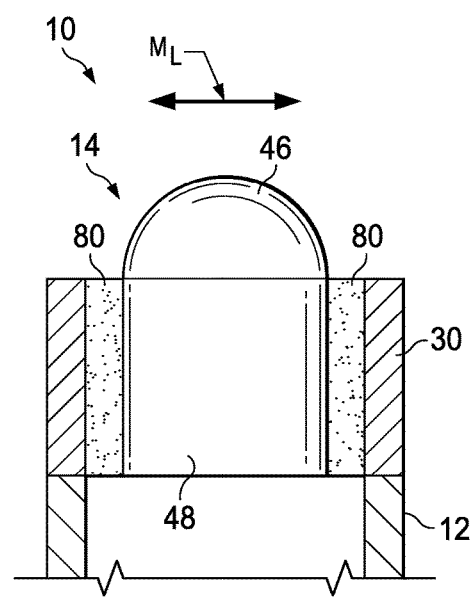
FIG. 7

TOUCH SCREEN STYLUS WITH FORCE AND/OR ANGLE SENSING FUNCTIONALITY

CROSS-REFERENCE TO RELATED APPLICATIONS

This application claims the benefit of U.S. Provisional Application No. 61/868,899 filed on Aug. 22, 2013, which is incorporated herein in its entirety.

TECHNICAL FIELD

The present disclosure is related to a stylus for interfacing with an electronic device, e.g., a touch screen of an electronic device, such as a smart phone, tablet, e-reader, etc.

BACKGROUND

Touch screens have become ubiquitous, e.g., in devices including smart phones, tablets, e-readers, and numerous other device. A touch screen stylus allows a user to input data, in particular graphical data, check marks, signature, etc. or handle a user interface including buttons, sliders or other operative elements of a user screen. However most users are still not used to drawing with their fingers. Moreover, with existing styluses it is not easily possible to choose a parameter such as line width and color. Most styluses are simply pointing devices with no specific or secondary functionality with respect to a touch screen. At best some conventional stylus allow to measure a point pressure to determine line width or use a modulation scheme to differentiate between the touch of a user's palm and the tip of the stylus.

SUMMARY

There exists a need an improved stylus for such touch screen applications, in particular for a stylus that allows to easily select a parameter such as for example line width, style or color. Further, there is a need for a level of artistic control afforded by a pencil, for example, the ability to hold the stylus vertically for thin lines and slant it for wider lines. A proposed intelligent stylus would be able to differentiate an angle for line width, for example, by rotation of the pen, it would allow on the fly to control of color or shade or any other suitable parameter. Detected forces may be used to control, for example, color selection or color density or any other suitable parameter.

According to various embodiments, a touch screen stylus can be designed to comprise a specific tip of the stylus that allows, for example, to select a parameter such as color and line thickness. When the user puts pressure on the tip of the stylus, the tip is displaced toward the opposite wall of the stylus. The angle of the stylus relative to the touch screen surface may be determined by the relative shift in the capacitive sensors around the wall of the stylus, e.g., to determine a visual parameter of markings generated on the touch screen, for example the color of such markings. The amount of displacement may be determined by an absolute shift in capacitance of the applicable sensor, e.g., to determines another visual parameter, e.g., the width of a line drawn on the screen. This system could be also augmented with haptic feedback to simulate the drag of the pencil on paper.

One embodiment provides a handheld stylus for use with a display device may include a handheld body, a tip movably coupled to the body, and at least one capacitive sensor configured to detect movements of the tip relative to the body. The at least one capacitive sensor may comprise at least one first conductive element secured to or integral with the body, and at least one second conductive element secured to or integral with the movable tip. The tip may be arranged such that the at least one first conductive element and the at least one second conductive element are spaced apart from each other. The at least one capacitive sensor may be configured to detect changes in respective distances between the at least one first conductive element and the at least one second conductive element caused by movements of the tip relative to the body.

Another embodiment provides a handheld stylus for use with a display device may include a handheld body, an outer ring fixedly to or integral with the body, a tip arranged within and spaced apart from the outer ring, and being movably coupled to the body for movement relative to the outer ring in response to forces applied to the tip, and at least one capacitive sensor defined between the outer ring and the tip and being configured to detect relative movements between the tip and the outer ring. The stylus may be configured for generating markings on the display device, and may include control electronics configured to receive signals from the at least one capacitive sensor of the stylus, and generate signals for controlling a visual parameter of the markings generated on the display device based on the signals received from the at least one capacitive sensor.

Another embodiment provides a system include a display device and a handheld stylus configured to interact with the display device for generating markings on the display device. The stylus may include a handheld body, a tip movably coupled to the body, at least one capacitive sensor configured to detect movements of the tip relative to the body, and control electronics configured to receive signals from the at least one capacitive sensor of the stylus, and generate signals for controlling a visual parameter of markings generated on the display device based on the signals received from the at least one capacitive sensor.

Another embodiment provides a system including a display device and a handheld stylus configured to interact with the display device for generating markings on the display device. The stylus may include a handheld body, an outer ring fixedly to or integral with the body, a tip arranged within and spaced apart from the outer ring, and being movably coupled to the body such that the tip is movable relative to the outer ring in response to forces applied to the tip, at least one capacitive sensor defined between the outer ring and the tip and being configured to detect relative movements between the tip and the outer ring, and control electronics configured to receive signals from the at least one capacitive sensor of the stylus, and generate signals for controlling a visual parameter of markings generated on the display device based on the signals received from the at least one capacitive sensor.

BRIEF DESCRIPTION OF THE DRAWINGS

Example embodiments of the disclosure may be understood by referring, in part, to the following description and the accompanying drawings wherein:

FIG. 2A illustrates an example embodiment of a stylus including a plurality of capacitive sensors at the stylus tip, including a plurality of sensor elements arranged around a grounded conductive element;

FIG. 2B illustrates an example embodiment of a stylus including a plurality of capacitive sensors at the stylus tip, including a grounded conductive element arranged around a plurality of sensor elements;

FIG. 3 illustrates an example configuration of a stylus configured to detect lateral movement of the stylus tip;

FIG. 4 illustrates an example configuration of a stylus configured to detect both lateral and axial movement of the stylus tip;

FIG. 5 illustrates another view of the example stylus configuration of FIG. 4;

FIG. 6 illustrates an alternative embodiment for providing an axial biasing force and managing the axial movement of the stylus tip;

FIG. 7 illustrates another example configuration of a stylus configured to detect lateral movement of the stylus tip;

DETAILED DESCRIPTION OF THE DRAWINGS

Some embodiments of the disclosure may be understood by referring, in part, to the following description and the accompanying drawings, in which like reference numbers refer to the same or like parts.

Figure 1:
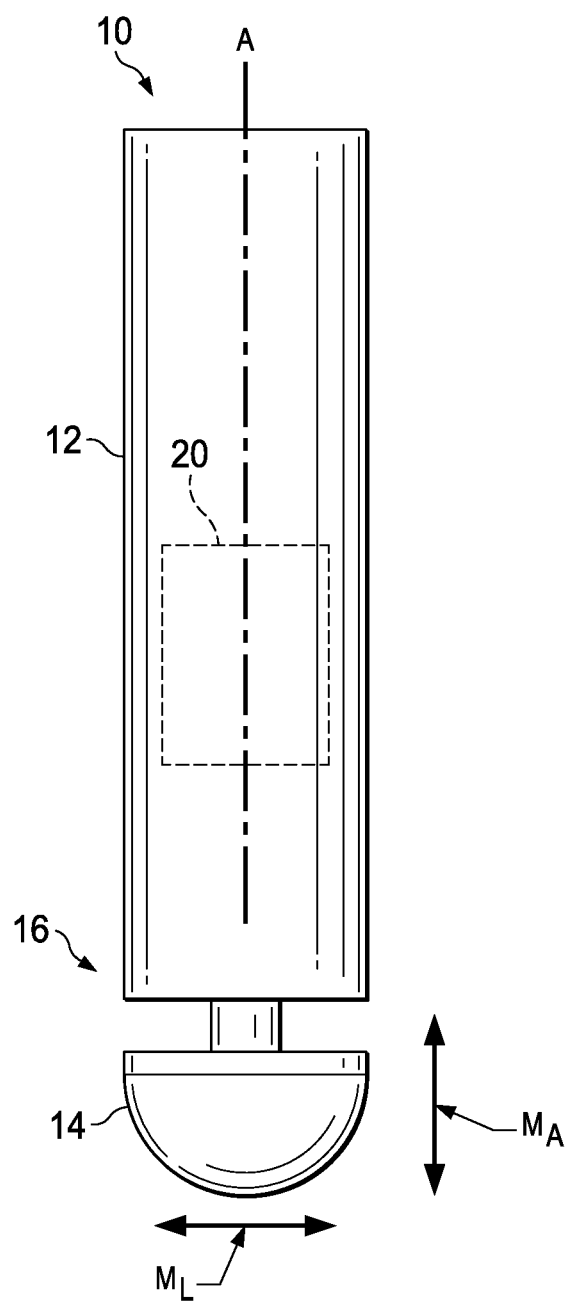
FIG. 1 illustrates a simplified view of a force-detecting stylus according to the present invention.

FIG. 1 illustrates a simplified view of a force-detecting stylus 10 according to the present invention. Force-detecting stylus 10 includes a body 12 sized and shaped to be handheld, a tip 14 that is movably coupled to the body, a force detection system 16 configured to detect movements of the tip 14 relative to the body 12, and control electronics 20 configured to analyze signals from the force detection system 16 and communicate related data signals to an associated display device, as discussed below.

Force detection system 16 may be configured to detect movements of the stylus tip 14 relative to stylus body 12 in one or more direction. For example, force detection system 16 may be configured to detect (a) lateral movements of tip 14 relative to body 12, e.g., generally perpendicular to a longitudinal axis A of the stylus body 12 (such lateral movements being indicated by arrow $M_L$), or (b) axial movements of tip 14 relative to body 12, e.g., generally along or parallel to the longitudinal axis A (such axial movements being indicated by arrow $M_A$), (c) both lateral and axial movements of tip 14, depending on the particular embodiment. Such movements of tip 14 may result from a user pressing the tip 14 of stylus 10 against a display device with varied pressure and at varied angles relative to the display device 10.

Force detection system 16 may include one or more capacitive sensors configured to detect lateral movements, axial movements, or both lateral and axial movements of tip 14. As discussed below in greater detail, such capacitive sensors may include at least one first conductive element secured to or integral with the stylus body 12 and at least one second conductive element secured to or integral with the movable tip 14, which first and second conductive element interact with each other define at least one capacitive sensor.

Control electronics 20 may be configured to analyze signals received from force detection system 16, e.g., signals from capacitive sensors indicating movement of tip 14, to calculate one or more parameters, such as the angle of force on the tip 14 (e.g., indicating the angle at which the stylus 10 is held against the display device) and/or the magnitude of force on the tip 14 (e.g., indicating the force with which the user is pressing the stylus 10 against the display device). In some embodiments, control electronics 20 may then communicate such parameters in the form of data signals to the display device, which may then influence the visual appearance of a marking displayed on the screen (e.g., a point or line drawn by the stylus) based on the data signals received from the stylus 10. For example, the display device may adjust the thickness/width, the color, the shading, and/or other parameter(s) of the markings traced by the stylus based the data signals received from the stylus, e.g., indicating the angle of the stylus relative to the display device, the force of the stylus pressed against the display device, and/or other parameter(s) determined and communicated by force detection system 16.

FIGS. 2A and 2B illustrate two example designs of force-sensing stylus 10, according to two example embodiments. As shown, stylus 10 includes a ring 30 fixedly secured to or integral with the body 12, with the tip 14 arranged radially within the ring 30. Tip 14 may be coupled to body 12 in a manner that allows for lateral movement (indicated by arrow $M_L$), or axial movement (indicated by arrow $M_A$), or both lateral and axial movement, relative to body 12. In these example embodiments, tip 14 is coupled to body 12 by a flexible elongated member 36, e.g., a rod formed from spring steel or other elastic material. A first end 38 of elongated member 36 is coupled to stylus body 12, and a second end 40 of elongated member 36 supports tip 14. Tip 14 may be spaced apart from ring 30 by a gap 32, such that tip 14 is movable within ring 30. Gap 32 may be an air gap or filled with a flexible or malleable material, e.g., foam or other material.

In some embodiments, first end 38 of elongated member 36 is rigidly coupled to body 12, such that the free end of elongated member 36 can flex (as indicated by arrows $EM_F$) to allow lateral movement tip 14 when a lateral or angled force is applied to tip 14, e.g., when the stylus 10 is pressed against a display device at a non-normal angle. In other embodiments, e.g., as shown in FIGS. 4-6 and 9 discussed below, first end 38 of elongated member 36 is coupled to body 12 in a manner than allows for axial movement of member 36 relative to body 12, such that member 36 can both flex laterally (as indicated by arrows $EM_F$) and move axially (as indicated by arrows $EM_A$), in response to various lateral, axial, and angled forces applied to tip 14, e.g., when the stylus 10 is pressed against a display device at normal and non-normal angles.

Tip 14 may include a tip element 46 supported on a tip base 48. In some embodiments, tip element 46 is formed from a deformable material, e.g., foam, rubber, or other deformable material. The tip base 48 may define or support one or more capacitive sensor elements, as discussed below.

As discussed above, stylus 10 may include a force detection system 16 including one or more capacitive sensors configured to detect lateral, axial, or both lateral and axial movements of tip 14, depending on the particular embodiment. In the embodiments of FIGS. 2A and 2B, stylus 10 includes a plurality of capacitive sensors 50, each defined by an interaction between a conductive element secured to or integral with the stylus body 12 and a conductive element secured to or integral with the movable tip 14. Stylus 10 may include any number of conductive elements to define any suitable number of capacitive sensors 50 for detecting movements of tip 14.

As shown, the embodiment of FIG. 2A includes a plurality of conductive sensor elements 52 coupled to ring 30 at regular intervals around the circumference of ring 30, and a single conductive element 54 defined by or coupled to tip base 48 and extending at least partially around the circumference of tip base 48. Element 54 may be electrically grounded. Each conductive sensor element 52 on ring 30 interacts with the conductive element 54 on tip base 48 to define a capacitive sensor 50. The illustrated example includes four conductive sensor elements 52 spaced at 90 degree intervals around ring 30, thus defining four capacitive sensors 50. However, other embodiment may include any other number of conductive sensor elements 52, e.g., three, five, six, seven, eight, nine, ten, eleven, twelve, or more sensor elements, which may be spaced evenly or otherwise around ring 30. Further, other embodiments may include multiple conductive elements 54 arranged around tip base 48.

In contrast, the embodiment of FIG. 2B includes a plurality of conductive sensor elements 52 arranged at regular intervals around the circumference of tip base 48, and a single conductive element 54 defined by or coupled to ring 30 and extending at least partially around the circumference of ring 30. Element 54 may be electrically grounded. Each conductive sensor element 52 on tip base 48 interacts with the conductive element 54 on ring 30 to define a capacitive sensor 50. The illustrated example includes four conductive sensor elements 52 spaced at 90 degree intervals around on tip base 48, thus defining four capacitive sensors 50. However, other embodiment may include any other number of conductive sensor elements 52, e.g., three, five, six, seven, eight, nine, ten, eleven, twelve, or more sensor elements, which may be spaced evenly or otherwise around on tip base 48. Further, other embodiments may include multiple conductive elements 54 arranged around ring 30.

When tip 14 is moved laterally, e.g., when a user holding the stylus at a non-normal angle to a display device surface presses the stylus tip 14 against the device surface, the respective distances between individual sensor elements 52 and conductive element 54—indicated in FIGS. 2A and 2B as distances $D_C$—increase or decrease, in proportion to the angle of the stylus relative to the device surface and the amount of force applied by the user. The capacitive sensors 50 are configured to detect the respective changes in distances $D_C$, which are manifested as changes in capacitance at each respective sensor 50. Capacitance signals detected by each sensor 50 are communicated to control electronics, which include executable algorithms configured to calculate the direction and magnitude of lateral movement of the tip 14, and may further calculate from such parameters a rotational angle of the stylus around the longitudinal axis, an angle of the stylus relative to a display device against which the stylus is being pressed, as well as the force at which the stylus is being pressed against the display device. Any or all of such calculated data may then be communicated to the display device, e.g., as discussed below in more detail.

In the example embodiments of FIGS. 2A and 2B, the respective conductive sensor elements 52 and conductive element 54 are arranged in the same plane in the axial direction. In other embodiments, one or more of the conductive sensor elements 52 may be offset from each other, or from the respective conductive element(s) 54, in the axial direction. Some embodiments may include elements 52 and/or 54 offset from each other in the axial direction in order to detect axial movements of the tip 14. For example, stylus 10 may include two or more rings of sensor elements 52 arranged offset from each other in the axial direction, with each ring including multiple sensor elements 52 arranged around the circumference of the ring 30 or tip base 48. Alternatively, or additionally, stylus 10 may include two or more ring-shaped conductive elements 54, or rings of discrete conductive elements 54, arranged offset from each other in the axial direction, e.g., defining two or more offset conductive element rings around the circumference of the ring 30 or tip base 48.

FIGS. 3-9 illustrate some example configurations for coupling stylus tip 14 to body 12 to allow lateral and/or movement of tip 14 relative to body 12.

FIG. 3 shows an example configuration in which a remote end 38 of elongated support member 36, e.g., a flexible rod, is securely fixed to body 12, with tip 14 arranged within a ring 30. This embodiment allows lateral movement of tip 14 (via flexing of rod 36), and may include capacitive sensors 50 for detecting such lateral movement, e.g., using an arrangement of capacitive sensors 50 as shown in FIG. 2A or 2B.

FIG. 4 shows an example configuration in which the elongated support member 36, e.g., a flexible rod, movably coupled to body 12. As shown, support member 36 may be axially guided through a tubular support structure 60 fixed to body 12, and biased by a spring or other biasing member 62 toward the direction of the tip 14. This embodiment allows for both lateral movement of tip 14 (via flexing of rod 36) and axial movement of tip 14 (via axial movement of support member 36), and may include any arrangement of capacitive sensors 50 for detecting such lateral and axial movements. For example, the stylus may include an arrangement of capacitive sensors 50 at or near tip 14 for detecting lateral movement or tip 14 (e.g., using an arrangement of capacitive sensors 50 as shown in FIG. 2A or 2B), and a capacitive vertical force sensor 50A at the remote end 38 of support member 36 for detecting axial movement of the tip 14/support member 36 assembly, e.g., as shown in FIG. 4. As another example, instead of the capacitive vertical force sensor 50A at the remote end 38 of support member 36, the stylus may use an arrangement of capacitive sensors 50 at or near 14 that includes multiple rings or sets of conductive sensor elements 52 and/or conductive element(s) 54 arranged offset from each other in the axial direction, for detecting both lateral movement and axial movement of tip 14, e.g., as discussed below with reference to FIG. 9.

FIG. 5 shows a three-dimensional view of an example embodiment similar to the embodiment of FIG. 4. As shown, support member 36 is guided through an opening in a support structure 60 fixed to body 12, and biased by a spring 62 toward the direction of the tip 14. Again, this embodiment allows for both lateral movement of tip 14 (via flexing of rod 36) and axial movement of the tip 14/support member 36 assembly, and may include any arrangement of capacitive sensors 50 for detecting such lateral and axial movements. For example, as shown, the stylus may include an arrangement of capacitive sensors 50 at or near tip 14 for detecting lateral movement or tip 14, and a capacitive vertical force sensor 50A at the remote end 38 of support member 36 for detecting axial movement of the tip 14/support member 36 assembly.

FIG. 6 illustrates an alternative to the embodiment of FIG. 5 for managing and detecting axial movement of the tip 14/support member 36 assembly. Instead of a spring or other biasing member 62 acting on a fixed support 60, an elastic foam or other deformable elastic material 68 may be arranged between the conductive elements (e.g., plates) 70A and 70B of the capacitive vertical force sensor 50A, to bias the tip 14/support member 36 assembly toward the tip 14, and to limit the axial movement of the support member 36 (thereby preventing the capacitor 50A from shorting).

FIG. 7 illustrates another example embodiment of stylus 10, in which a deformable elastic material 80, e.g., foam, is arranged in the gap between the tip base 48 and ring 30. Capacitive sensors 50 may be arranged at the tip base 48 and ring 30, e.g., according to any of the examples discussed above. The deformable elastic material 80 may allow lateral movement of the tip 14 but provide elastic resistance, such that tip 14 re-centers within ring 30 when the force is removed. This design may also prevent or substantially reduce the likelihood of tip base 48 contacting the surrounding ring 30, thereby preventing shorting of the capacitive sensors 50. Although the illustrated example shows tip 14 fixed in the axial direction, this embodiment may be also combined with any suitable mechanism or design allowing axial movement of tip 14 and capacitive-based detection of such movement.

Figure 8:
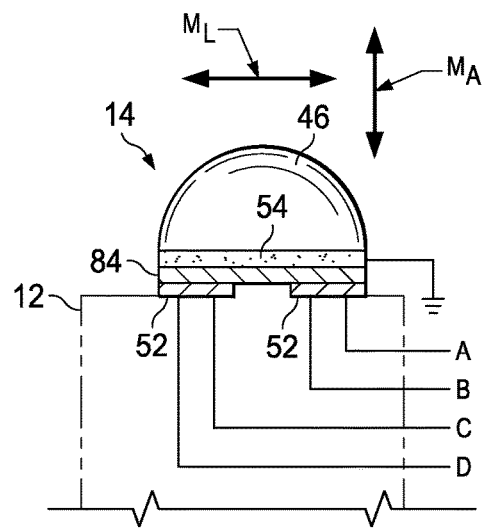
FIG. 8 illustrates another example configuration of a stylus configured to detect both lateral and axial movement of the stylus tip.

FIG. 8 illustrates another example embodiment, in which a plurality of vertically-arranged capacitive sensors 50 are used for detecting both lateral and axial movements of tip 14. As shown, a plurality of conductive sensor elements 52 are mounted on or otherwise affixed to stylus body 12. An deformable elastic layer 68 (e.g., elastic foam) is arranged over the conductive sensor elements 52, a disk-shaped conductive element 54 is arranged over the elastic layer 68, and a tip element 46 is mounted on the conductive element 54. The plurality of conductive sensor elements 52 interact with the conductive element 54 to define a plurality of capacitive sensors 50. The conductive sensor elements 52 may include any suitable number of sensor elements 52 (e.g., one, two, three, four, five, six, seven, eight, or more), which may be arranged in any suitable pattern, e.g., in a ring-shaped pattern, a ring-shaped pattern with a central sensor element 52 centered within the ring-shaped pattern, a rectangular row/column array, or any other suitable pattern. The illustrated example includes four sensor elements 52 arranged at 90 degrees from each other, thereby defining four capacitive sensors 50.

The signals from the capacitive sensors 50 can be analyzed by control electronics to determine the angular rotation of conductive element 54 relative to the array of conductive sensor elements 52 (and thus, relative to stylus body 12), as well as the movement of conductive element 54 toward or away from sensor elements 52, which may be further processed to calculate an angle of the stylus relative to a display device against which the stylus is being pressed, as well as the force at which the stylus is being pressed against the display device.

Figure 9:
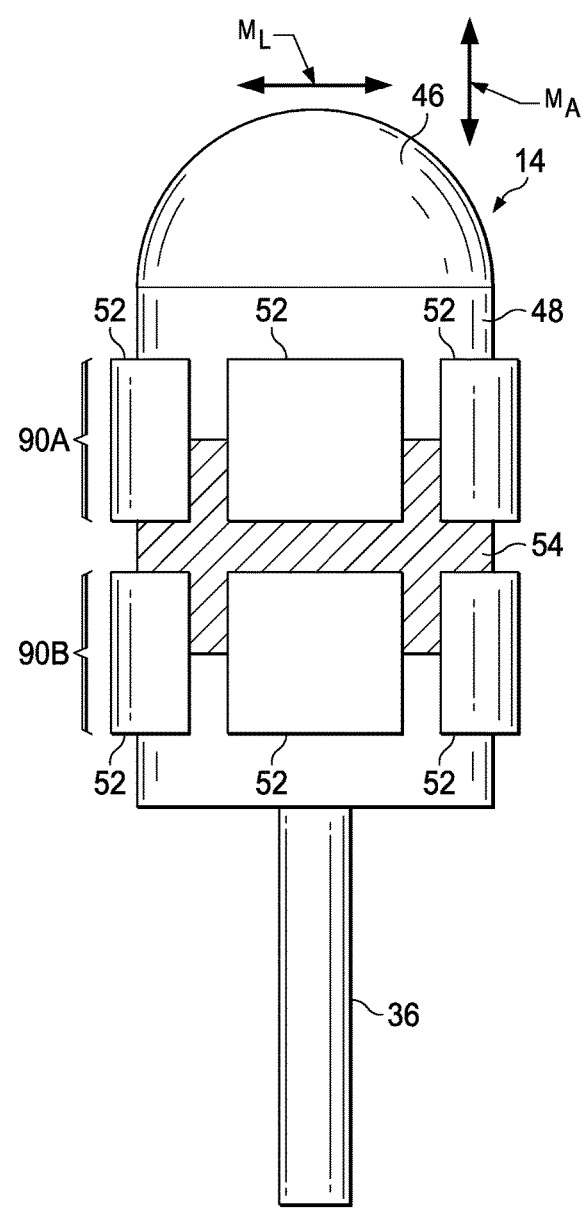
FIG. 9 illustrates another example configuration of a stylus configured to detect both lateral and axial movement of the stylus tip, by using multiple rows of capacitive sensors offset from each other in the axial direction.

FIG. 9 illustrates an example embodiment including two rows of capacitive sensors 50 for detecting both lateral movement ($M_L$) and axial movement ($M_A$) of tip 14 relative to body 12. As shown, conductive sensor elements 52 are arranged in two rows 90A and 90B extending around a ring-shaped conductive element 54. In this example, the conductive sensor elements 52 are fixed to the stylus body 12 and the conductive element 54 is fixed to tip 14. In other embodiments, conductive sensor elements 52 may be fixed to the tip 14, with the conductive element 54 fixed to the body 12 and extending around the conductive sensor elements 52 (e.g., similar to the arrangement of FIG. 2B).

Lateral movements of tip 14 may be detected by comparing the respective capacitance signals from the sensor elements 52 within each individual row 90A and/or 90B. For example, ratios of signals from the sensor elements 52 within a particular row 90 may be analyzed to calculate lateral movements of tip 14. Axial movements of tip 14 may be detected by comparing the respective capacitance signals between rows 90A and 90B. For example, the ratio of capacitance signals from row 90A to capacitance signals from row 90B may be analyzed to calculate axial movements of tip 14. The calculated lateral movements and axial movements may be used to calculate various parameters, such as the rotational angle of the stylus around the longitudinal axis, the angle of the stylus relative to the device surface against which it the stylus tip is being pressed, the amount of force applied to the stylus against the device surface, etc., using any suitable algorithms.

Figure 10:
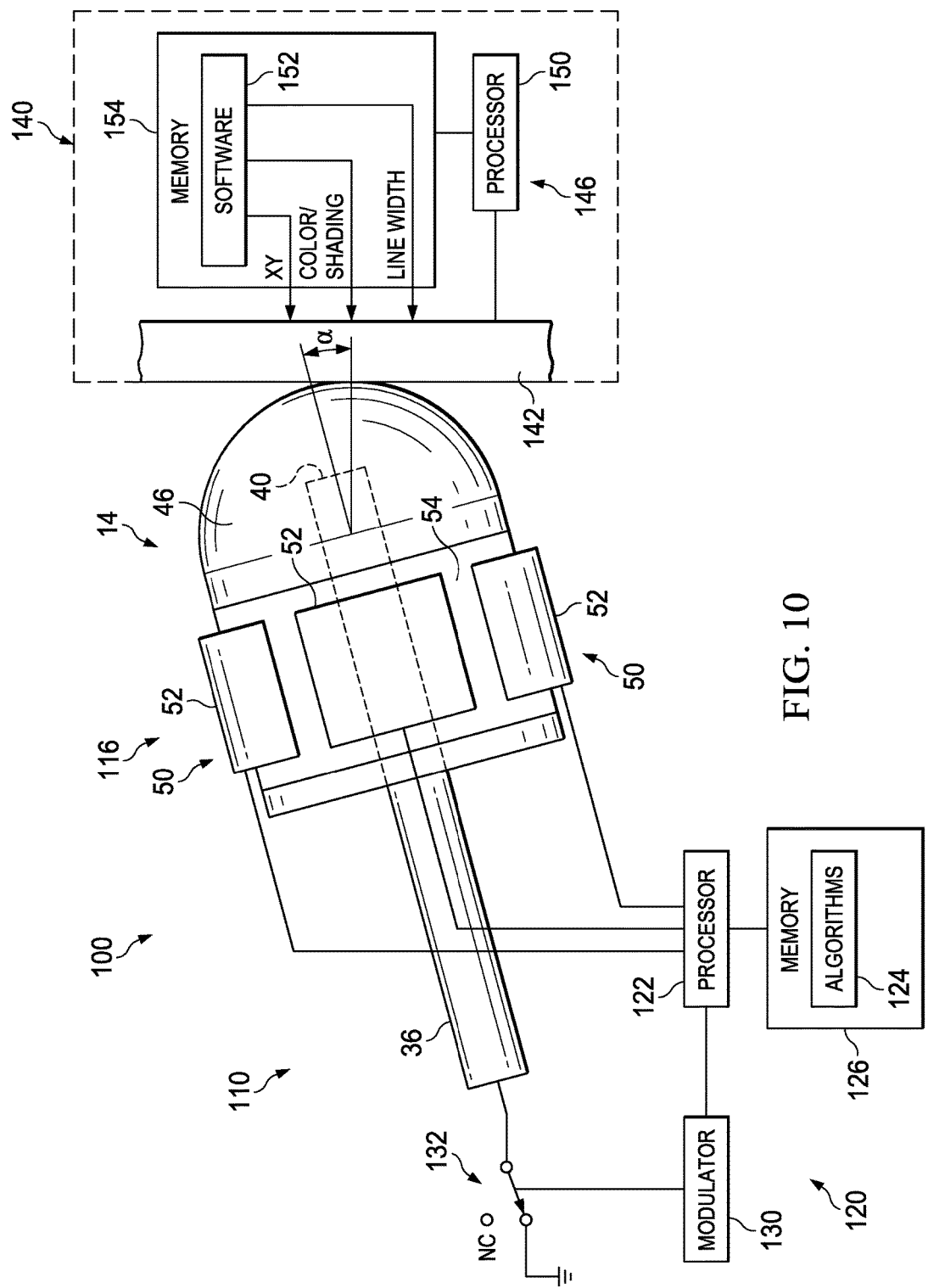
FIG. 10 illustrates an example system including a stylus and a display device having a capacitive touch screen.

FIG. 10 illustrates an example system 100 including an active stylus 110 and a display device 140 having a capacitive touch screen 142. The active stylus 110 is configured to detect tip movements, calculate forces and/or other related data, and communicating such calculated data to the display device 140 in real time, e.g., via a modulated signal communicated from the stylus tip 14 to the display device 140. Display device 140 may be any device that includes a capacitive touch screen (e.g., a PCT or PCAP screen), such as a smart phone, tablet, e-reader, or any other suitable device.

As shown, stylus 110 includes a capacitance-based force detection system 116 configured to detect capacitance signals corresponding to movements of tip 14, e.g., according to any of the example embodiments discussed above, and control electronics 120 configured to analyze the detected capacitance signals to calculate related data (e.g., the physical orientation of stylus 110 and forces applied to tip 14), and communicate such data to display device 140. Control electronics 120 may include a processor 122, algorithms or other logic instructions 124 stored in non-transitory memory 126, and a modulator 130 for generating modulated signals for communication to display device 140. Algorithms 124 may include any suitable algorithms for calculating from the detected capacitance signals any of the types of data discussed herein, e.g., changes in distance between respective capacitive elements, lateral and/or axial movements of stylus tip 14, a rotational angle of the stylus around the longitudinal axis, an angle of the stylus relative to the touch screen 142, the amount of force applied to the stylus against the touch screen 142, etc.

Modulator 130 may be configured to generate signals for modulating a switch 132 to deliver a modulated electrical signal through an electrically conductive member 36, which may be wirelessly communicated to display device 140 via a conductive coupling between the tip-located end 40 of member 36 and the capacitive touch screen 142. For example, modulator 130 may generate and communicate a modulated square wave signal, or pulse width modulated signals. Modulator 130 may communicate such data in real time, such that display device 140 can process such data and influence the markings displayed on the touch screen 142 based on such data. In other embodiments, modulator 130 may communicate modulated signals to display device 140 via one or more sensor element(s) 52 and/or conductive element(s) 54 of the force detection system 116. In other embodiments, modulator 130 may communicate modulated signals to display device 140 via other conductive element (s) provided in stylus 110. In still other embodiments, stylus 110 may communicate such tip sensor data via a separate wireless or wired interface with display device 140. To this end, separate wireless circuitry may be incorporated into the stylus 110.

Display device 140 may include control electronics 146 including a processor 150 and software or other logic instructions 152 stored in non-transitory memory 154 for analyzing received data and generating markings on the touch screen 142 based on interactions of the stylus 110 with the capacitive touch screen 142.

For example, the stylus 110 may be moved across the surface of touch screen 142. The stylus control electronics 120 detects capacitive signals from force detection system 116 and calculates associated tip sensor data regarding the orientation, forces, etc. of stylus 110 relative to the touch screen 142, and modulates a signal through the capacitive coupling between the stylus tip 14 (e.g., the end 40 of member 36) and the touch screen 142. The touch screen control electronics 146 detect the modulated tip sensor signals from stylus 110 (indicating, e.g., the orientation and forces on stylus 110), in addition to the typical x-y location detection of the stylus tip 14 on the screen 142. The touch screen control electronics 146 (e.g., by execution of software 152 by processors 150) may then use the tip sensor data received from stylus 110 to influence one or more visual aspects of the markings displayed on screen 142, in real time. For example, control electronics 146 may adjust the line thickness or width, the color, the shading, and/or other parameter(s) of markings traced by the stylus 110 on the screen based the received tip sensor data.

As one example, software 152 may use the tip sensor data received from stylus 110 to simulate a pencil, e.g., by controlling the line thickness and/or line darkness (or shading percentage) displayed on the screen based on the angle of the stylus relative to the screen surface, wherein the displayed thickness of the line increases in proportion to the deviation of the stylus orientation from normal to the surface. As another example, software 152 may control the thickness and/or line darkness (or shading percentage) displayed on the screen based on the magnitude of force detected between the stylus tip 14 and touch screen 142. As another example, software 152 may control the thickness and/or line darkness (or shading percentage) displayed on the screen based on both (a) the angle of the stylus relative to the screen surface and (b) the magnitude of force detected between the stylus tip 14 and touch screen 142.

In addition, software 152 may control another parameter, e.g., the color, shading, etc. of markings displayed on the screen based on a detected angle of rotation of the stylus around a longitudinal axis of the stylus. Thus, a user may select a desired color, for example, by rotating the stylus to different angles. For example, the 360 degrees of rotation may be divided into two, three, four, five, six, seven, eight, or more different colors, such that user may select and switch between the different colors as desired by simply rotating the stylus accordingly.

Although the disclosed embodiments are described in detail in the present disclosure, it should be understood that various changes, substitutions and alterations can be made to the embodiments without departing from their spirit and scope.

What is claimed is:

1. A handheld stylus, comprising:
a handheld body;
an outer ring coupled to or integral with the body;
a tip arranged radially inside of the outer ring and spaced apart from the outer ring to be movable with respect to the outer ring, the tip being movably coupled to the body such that the tip is movable relative to the outer ring and in an axial direction in response to forces applied to the tip; and
a plurality of capacitive sensors defined between the outer ring and the tip, the plurality of capacitive sensors arranged in two rows spaced apart from each other in the axial direction, each of the plurality of capacitive sensors configured to detect a respective capacitance during an interaction between the handheld stylus and a display device; and
a processor configured to:
calculate, based on the respective capacitances detected by the plurality of capacitive sensors arranged spaced apart from each other in the axial direction, relative movements between the tip and the outer ring along the axial direction resulting from forces applied to the tip;
calculate, based on the respective capacitances detected by the plurality of capacitive sensors, stylus state data including at least one of (a) an angle of the stylus relative to the display device or (b) a magnitude of force on the stylus tip; and
communicate the calculated stylus state data to the display device to control a visual parameter of markings generated on the display device based on the calculated stylus state data.

2. The handheld stylus of claim 1, comprising:
at least one first conductive element secured to or integral with the outer ring and located at least partially around a circumference of the ring;
a plurality of second conductive elements secured to or integral with the movable tip and located at least partially around a circumference of the tip and being arranged in two rows spaced apart in the axial direction;
wherein the tip is arranged such that the at least one first conductive element and the plurality of second conductive elements are spaced apart from each other;
wherein the plurality of capacitive sensors are formed by the at least one first conductive elements and the plurality of second conductive elements, respectively; and
wherein the plurality of capacitive sensors is configured to detect a plurality of respective capacitance values representing changes in respective distances between the at least one first conductive element and the plurality of second conductive elements, respectively caused by movement of the tip relative to the body.

3. The handheld stylus of claim 1, comprising:
at least one first conductive element secured to or integral with the tip and located at least partially around a circumference of the tip;
a plurality of second conductive elements secured to or integral with around the outer ring and located in two rows at least partially around a circumference of the outer ring;
wherein the tip is arranged such that the at least one first conductive element and the plurality of second conductive elements are spaced apart from each other;
wherein the plurality of capacitive sensors are formed by the at least one first conductive element and the plurality of second conductive elements, respectively;
wherein the at least first conductive element extends from a center between the two rows in the axial direction towards the first row less than the plurality of second conductive elements of the first row and in direction towards the second row less than the plurality of second conductive elements of the second row, and
wherein the plurality of capacitive sensors is configured to detect a plurality of respective capacitance values representing changes in respective distances between the at least one first conductive element and the plurality of second conductive elements, respectively caused by movement of the tip relative to the body.

4. The handheld stylus of claim 3, wherein the first conductive element is a single first conductive element extending at least partially around the circumference of the tip or the inner surface of the outer ring.

5. The handheld stylus of claim 3, wherein a single first conductive element is coupled through a switch with ground.

6. The handheld stylus of claim 1, wherein the plurality of capacitive sensors is configured to detect the axial movements of the tip.

7. The handheld stylus of claim 1, wherein the tip is movably coupled to the body through a flexible rod which allows movement of the tip along the axial direction, and wherein changes in the plurality of respective capacitances detected by the plurality of sensors of the first and second row are used to form a capacitive force sensor to detect the axial movements of the tip.

8. The handheld stylus of claim 1, wherein the control electronics are configured to generate signals for controlling a width of a line generated on the display device based on the signals received from the plurality of capacitive sensors.

9. The handheld stylus of claim 1, wherein the control electronics are configured to generate signals for controlling a color or shade of a line generated on the display device based on the signals received from the plurality of capacitive sensors.

10. The handheld stylus of claim 1, comprising:
electronics configured to generate data signals based on signals received from the plurality of capacitive sensors during an interaction between the stylus and a display device; and
a communication system integrated into the stylus and configured to communicate the data signals to the display device in real time.

11. The handheld stylus of claim 10, wherein the integrated communication system of the stylus is configured to communicate the data signals to the display device by controlling a capacitive coupling between the stylus tip and the display device.

12. A handheld stylus, comprising:
a handheld body;
an outer ring coupled to integral with the body;
a tip arranged within, and spaced apart from, the outer ring, the tip being movably coupled to the body such that the tip is movable relative to the outer ring in response to forces applied to the tip; and
a plurality of capacitive sensors defined between the outer ring and the tip, the plurality of sensors arranged spaced apart from each other in an axial direction, each of the plurality of capacitive sensors configured to detect a respective capacitance during an interaction between the handheld stylus and a display device; and
a processor configured to:
calculate, based on the respective capacitances detected by the plurality of capacitive sensors arranged spaced apart from each other in the axial direction, relative movements between the tip and the outer ring along the axial direction resulting from forces applied to the tip;
calculate, based on the respective capacitances detected by the plurality of capacitive sensors, stylus state data including at least one of (a) an angle of the stylus relative to the display device or (b) a magnitude of force on the stylus tip; and
communicate the calculated stylus state data to the display device for controlling a visual parameter of markings generated on the display device based on the calculated stylus state data.

13. The handheld stylus of claim 12, comprising an elongated member having a first end secured to the body and a second end coupled to the tip, the elongated member configured to flex in response to the forces applied to the tip.

14. The handheld stylus of claim 12, wherein the tip comprises a deformable form element.

15. The handheld stylus of claim 12, wherein the outer ring is grounded, and the tip includes a plurality of capacitive sensor elements arranged at a perimeter of the tip and spaced apart from the outer ring, wherein the plurality of capacitive sensor elements and the grounded outer ring are configured to interact to define the plurality of capacitive sensors.

16. The handheld stylus of claim 12, wherein the tip is grounded and wherein the outer ring includes a plurality of conductive capacitive sensor elements arranged around a perimeter of the outer ring and configured to interact with the grounded tip to define a plurality of capacitive sensors.

17. A system, comprising:
a display device;
a handheld stylus configured to interact with the display device for generating markings on the display device, the stylus comprising:
a handheld body;
an outer ring coupled to or integral with the body;
a tip arranged radially inside of the outer ring and spaced apart from the outer ring to be movable with respect to the outer ring, the tip being movably coupled to the body such that the tip is movable relative to the outer ring in response to forces applied to the tip; and
a plurality of capacitive sensors defined between the outer ring and the tip, the plurality of sensors arranged spaced apart from each other in an axial direction, each of the plurality of capacitive sensors configured to detect a respective capacitance; and
control electronics configured to:
receive signals from the plurality of capacitive sensors arranged spaced apart from each other in the axial direction representing respective capacitances detected by the plurality of capacitive sensors;
calculate a relative movement in the axial direction between the tip and the outer ring based on the respective capacitances detected by the plurality of capacitive sensors;
calculate, based on the respective capacitances detected by the capacitive sensors, stylus state data including at least one of (a) an angle of the stylus relative to the display device or (b) a magnitude of force on the stylus tip; and
communicate the calculated stylus state data to the display device for controlling a visual parameter of markings generated on the display device based on the calculated stylus state data.

18. The system of claim 17, wherein the stylus comprises:
at least one first conductive element secured to or integral with the outer ring and located at least partially around a circumference of the ring;
a plurality of second conductive elements secured to or integral with the movable tip and located at least partially around a circumference of the tip and being arranged in two rows in the axial direction, wherein the at least one first conductive element is centered between the first and second row of second conductive elements;
wherein the tip is arranged such that the at least one first conductive element and the plurality of second conductive elements are spaced apart from each other;
wherein the plurality of capacitive sensors are formed by the at least one first conductive elements and the plurality of second conductive elements, respectively; and
wherein the plurality of capacitive sensors is configured to detect a plurality of respective capacitance values representing changes in respective distances between the at least one first conductive element and the plurality of second conductive elements, respectively caused by movement of the tip relative to the body.

19. The system of claim 17, wherein the control electronics are configured to generate signals for controlling a width of a line generated on the display device based on the signals received from the at least one capacitive sensor.

20. The system of claim 17, wherein the control electronics are configured to generate signals for controlling a color or shade of a line generated on the display device based on the signals received from the at least one capacitive sensor.

21. A handheld stylus configured to generate markings on a display device, the handheld stylus comprising:
an elongated handheld body extending in a longitudinal direction;
an outer ring coupled to integral with the body;
a tip arranged within, and spaced apart from, the outer ring, the tip being movably coupled to the body such that the tip is laterally movable relative to the outer ring in response to lateral forces applied to the tip in lateral directions perpendicular to the longitudinal direction; and
a plurality of capacitive sensors defined between the outer ring and the tip, each of the plurality of capacitive sensors configured to detect a respective capacitance; and
a processor configured to:
calculate, based on the respective capacitances detected by the capacitive sensors, lateral movements of the tip relative to the outer ring resulting from forces applied to the tip;
communicate data indicating the calculated lateral movements of the tip relative to the outer ring to the display device for controlling one or more visual parameters of markings generated on the display device based on the calculated lateral movements of the tip relative to the outer ring.

22. The handheld stylus of claim 21, wherein the tip is both axially and laterally movable relative to the outer ring in response to forces applied to the tip.

* * * * *